United States Patent [19]
Nakano

[11] Patent Number: 5,699,332
[45] Date of Patent: Dec. 16, 1997

[54] CONTROL CIRCUIT OF OPTICAL DISK SYSTEM TO IMPROVE TRANSITION FOR SEEK CONTROL TO TRACKING CONTROL

[75] Inventor: Junichi Nakano, Hino, Japan

[73] Assignee: Olympus Optical Co., Ltd., Tokyo, Japan

[21] Appl. No.: 713,255

[22] Filed: Sep. 12, 1996

[30] Foreign Application Priority Data

Sep. 18, 1995 [JP] Japan .................. 7-238617
Oct. 3, 1995 [JP] Japan .................. 7-256373

[51] Int. Cl.$^6$ .................................. G11B 17/22
[52] U.S. Cl. ........................... 369/32; 369/44.28
[58] Field of Search ........................ 369/32, 44.28, 369/44.29, 44.27, 44.34, 44.35; 360/78.04, 78.06

[56] References Cited

U.S. PATENT DOCUMENTS

| | | | |
|---|---|---|---|
| 5,046,060 | 9/1991 | Chow et al. | 369/32 |
| 5,050,146 | 9/1991 | Richgels et al. | 369/32 |
| 5,220,547 | 6/1993 | Yasukawa et al. | 369/32 |
| 5,408,454 | 4/1995 | Hasegawa | 369/44.28 |

FOREIGN PATENT DOCUMENTS 63-224037  9/1988  Japan .
3-37876    2/1991  Japan .

*Primary Examiner*—Tan Dinh
*Attorney, Agent, or Firm*—Armstrong, Westerman, Hattori, McLeland & Naughton

[57] ABSTRACT

A control circuit of an optical disk system has a tracking and seek control means for: controlling a position of a light beam emitted for recording and playing information to/from a track on an optical disk by driving a tracking actuator based on a tracking error signal representing at least positional difference between the light beam and the track; selectively performing seek control for controlling the light beam so that the light beam may traverse the track for moving the light beam to the destination track, and tracking control for controlling the light beam so that the light beam may follow the track; and outputting a brake pulse and moving control to the tracking control at the completion of the brake pulse at the completion of the seek control, wherein a width t of the brake pulse is set as follows:

$$t < 2d/v$$

where v is a goal value of a speed and d is a residual distance of the light beam to the destination track at the beginning of outputting the brake pulse.

16 Claims, 9 Drawing Sheets

CONTROL CIRCUIT OF OPTICAL DISK SYSTEM TO IMPROVE TRANSITION FOR SEEK CONTROL TO TRACKING CONTROL

BACKGROUND OF THE INVENTION

1. Field of the Invention

The present invention relates to a control circuit of an optical disk system for recording and playback of information to/from a disk-like optical recording medium.

2. Related Art Statement

In these several years, as optical disk systems spread, further cost reduction has been requested.

Although there are many approaches for achieving cost reduction of the optical disk systems, for example, it is one of ideas for reducing cost of a servo system to reduce each cost of an actuator, control circuit, and driving circuit by using an actuator both as a fine actuator and a coarse actuator in a tracking direction and driving them in one body, as disclosed in the publication of Japanese Unexamined Patent Publication No. 63-224037.

However, generally, there is a problem that this type of actuator where fine and coarse actuators are driven in one body, because of a structural reason, has an acceleration smaller than that of conventional actuators separately composed of fine and coarse actuators, the acceleration being generated instantaneously, that is, acceleration sensitivity is small. On the other hand, a case that a fine actuator is independent, it is possible to generate a large acceleration in spite of a small stroke.

In case a generated acceleration is small, it is very difficult to perform a motion necessitating a large acceleration in short time such as a track jumping motion, or a track pull-in motion at the time of returning to a tracking servo state after seek.

On the other hand, there is a method described in the publication of Japanese Unexamined Patent Publication No. 3-37876 as a method for stably performing the track pull-in motion after completion of seek. This is a track pull-in control method for outputting a brake pulse before transition to the tracking servo state and turning a tracking servo control on, the method stabilizing the track pull-in motion so that the speed of an optical head may become zero just over a destination track by having a height $\alpha$ and width t of the brake pulse be as follows:

$$t = 2d/v$$

$$\alpha = v^2/(2d)$$

Where d is a residual distance to the destination track at the beginning of braking and v is a residual speed at the beginning of the braking.

Generally, although the timing of entering into the track pull-in motion (starting outputting of a brake pulse) is mostly at the timing of a light beam coming at a half track before the destination track (in case of the 2× format in a 90 mm MO disk, the distance is 0.7 μm), in this case, let the residual speed be 10 mm/s, and then, $\alpha = 71.4$ m/s/s and $t = 140$ μs.

However, since the acceleration sensitivity is low in the above-described actuator where the fine and coarse actuators are driven in one body, a large current is necessary so as to generate this large acceleration. However, this is very difficult due to limitation of a supply voltage and power consumption as a system. From now on, as a track pitch is made to be narrower for higher density, a larger acceleration will become necessary, and hence, conditions will become severer. In addition, a necessary braking acceleration becomes small if a final residual speed is made to be low. However, speed control is apt to be unstable if the speed is excessively lowered. Hence, from this point also, it is difficult to start outputting the brake pulse a half track before the destination track.

Therefore, in the case where an actuator having a small generated acceleration like the actuator, where fine and coarse actuators are driven in one body, is used, it is impossible to achieve the track pull-in by starting a deceleration at a half track before the destination track. Hence, it cannot but be done to start outputting the brake pulse at one track before the destination track which is the next point where the timing can be detected. In this case, let the residual speed be 10 mm/s, and then, $\alpha = 5.7$ m/s/s and $t = 280$ μs.

However, in the state that the brake pulse is started at one track before the destination track as described above, a braking period becomes extremely long. Therefore, this method has a problem that this type of system is excessively weak in dispersion of a braking acceleration caused by the sensitivity change of an actuator and in disturbances during braking (eccentricity of a disk, vibration from its outside, and the like).

For example, regarding the sensitivity change of an actuator, in case the sensitivity change is 20%, the acceleration error of 7.2 m/s/s occurs at the braking acceleration of 36 m/s/s. However, if a pulse width is 280 μs, a large positional error occurs: $\frac{1}{2} \times 7.2$ m/s/s $\times \{280 \text{ μs}\}^2 = 0.28$ μm. Furthermore, in this case, a speed error occurs: 7.2 m/s/s × 280 μs = 2.02 mm/s.

This means that, in case the acceleration is small, a light beam passes through by 0.28 μm and its residual speed exists to a direction where the light beam leaves from the destination track. On the contrary, this means that, if the acceleration is large, the residual speed of the light beam exists at the point of 0.28 μm before the destination track to a direction where the optical head leaves from the destination track: the direction returning to the previous place. Therefore, this has a large possibility of going out of the range of a position and speed capable of pulling the actuator in the tracking servo state.

In addition, regarding disturbances, let an eccentric acceleration be 10 m/s/s, and then, the large positional error occurs: $\frac{1}{2} \times 10$ m/s/s $\times \{280 \text{ μs}\}^2 = 0.39$ μm. This error can be reduced a little by correction like holding a driving signal value just before braking start. However, this correction cannot correspond to a variance in case the disturbances change during braking, and hence, this also makes a pull-in characteristic of tracking after completion of a brake pulse worse.

That is, if a generated acceleration in a tracking direction is limited as the case that the actuator with low acceleration sensitivity like the actuator, where the fine and coarse actuators are driven in one body, is used, it cannot but be done to lengthen a braking period by widening the width of a brake pulse at the time of pull-in motion performed after completion of seek. However, if so, the actuator is easily affected by dispersion of actuator sensitivity and by disturbances, and hence, the position and speed after completion of the brake pulse go out of the range within which pull-in of tracking is possible. Therefore, a problem occurs that a track pull-in motion has a possibility of being unstable.

SUMMARY OF THE INVENTION

An object of the present invention is to provide a control circuit of an optical disk system which can reduce a positional error and speed error of a light beam from a destination track at the time of transition from seek control to tracking control and can perform a stable track pull-in motion.

Another object of the present invention is to provide a control circuit of an optical disk system which shortens a braking period at the time of starting the track pull-in motion, can make the influence of the errors of an actuator and disturbances less, and can stabilize the track pull-in motion after completion of braking.

A still more object of the present invention is to provide a control circuit of an optical disk system which can decrease the positional and speed errors of a light beam from a destination track at completion of braking and can perform a stable track pull-in motion, even if a braking period at the time of starting the track pull-in motion is long, and hence, the motion is easily affected by the dispersion of the actuator sensitivity and disturbances.

A further object of the present invention is to provide a control circuit of an optical disk system which can correct a brake pulse corresponding to a moving speed of a light beam during braking at the beginning of the track pull-in motion, and particularly, can decrease the speed error at completion of the brake pulse.

A furthermore object of the present invention is to provide a control circuit of an optical disk system which can perform the stable track pull-in motion even if a generated acceleration of an actuator is small, and can use an actuator with a low acceleration or reduce an actuator driving current.

A still more object of the present invention is to provide a control circuit of an optical disk system which can use a low-cost actuator where the fine and coarse actuators are driven in one body, can perform a stable track pull-in motion even if a large generated acceleration cannot be taken, and can reduce cost of the optical disk system.

One configuration of the present invention has a tracking and seek control means for: controlling a position of a light beam emitted for recording and playing information to/from a track on an optical disk by driving a tracking actuator based on a tracking error signal representing at least positional difference between the light beam and the track; selectively performing seek control for controlling the light beam so that the light beam may traverse the track for moving the light beam to the destination track, and tracking control for controlling the light beam so that the light beam may follow the track; and outputting a brake pulse and moving control to the tracking control at completion of the brake pulse at completion of the seek control, wherein a width t of the brake pulse is set as follows:

$$t < 2d/v$$

where v is a goal value of a speed and d is a residual distance of the light beam to the destination track at the beginning of outputting the brake pulse.

The other characteristics and merits of the present invention will sufficiently become apparent by the following description.

DETAILED DESCRIPTION OF THE PREFERRED EMBODIMENTS

Figure 1:
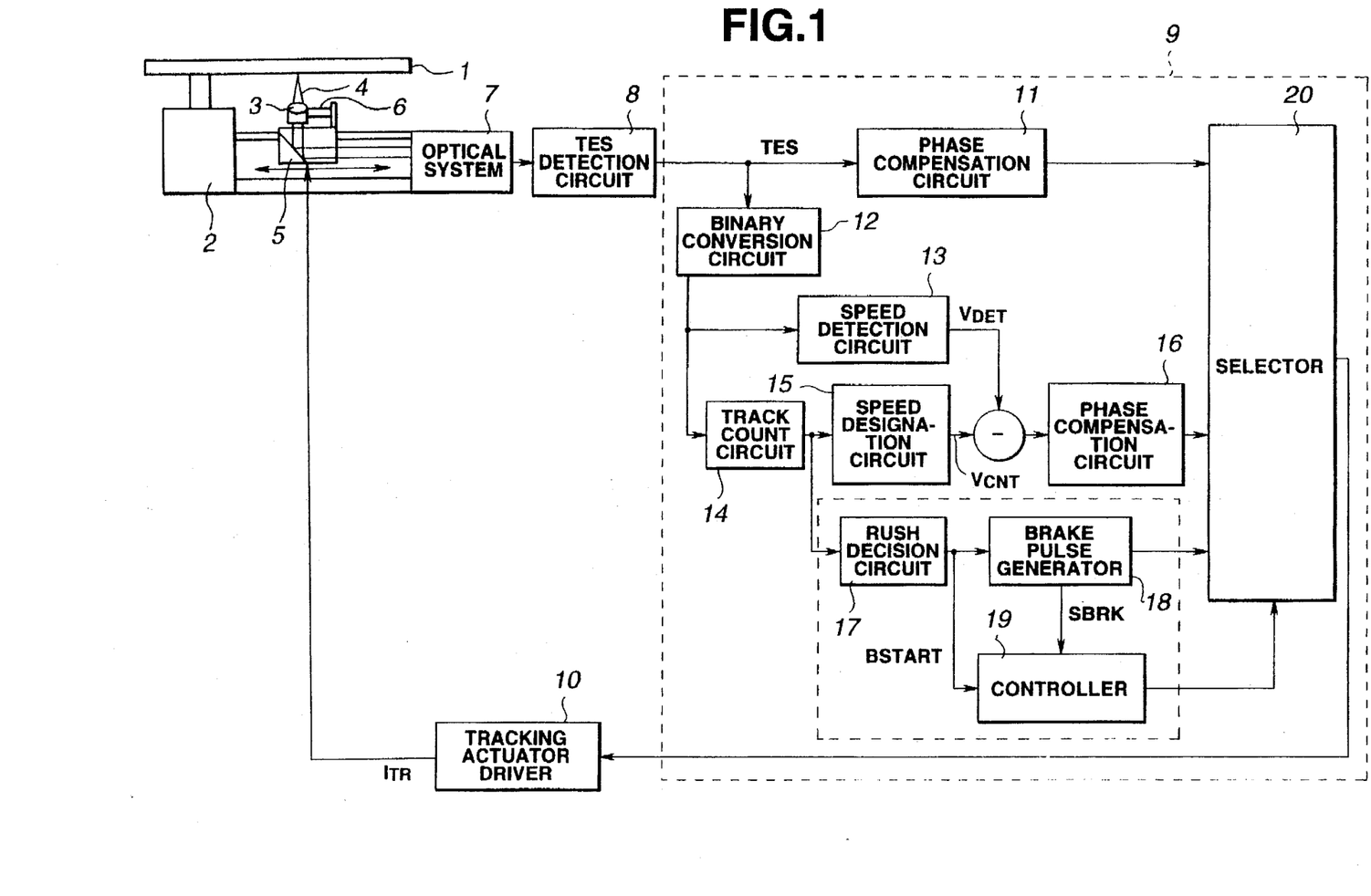
FIG. 1 is a block diagram showing a configuration of a tracking and seek control system in an optical disk system according to a first embodiment of the present invention.

FIG. 1 shows a configuration of a tracking and seek control system including a control circuit of the optical disk system according to a first embodiment of the present invention. Here, parts are omitted that do not directly relate to the description of the present embodiment, the parts being, for example, a playback signal processing circuit, host-computer interface circuit, focus control circuit, and the like.

The optical disk system comprises: a spindle motor 2 having an optical disk 1 with information tracks for recording information, and rotationally driving the optical disk 1; and, as components of an optical head for recording and playing information to/from the information tracks of the optical disk 1: an objective lens 3 for applying a light beam 4 to the information track of the optical disk 1; a focusing actuator 6 as a focus-moving means driving the objective lens 3 toward an optical axis (an up-and-down direction in FIG. 1, and hereinafter, this is called as a focusing direction); a carriage 5 having the objective lens 3, focusing actuator 6, and the like, the carriage being movable toward a radius of the optical disk 1; and an optical system 7 including a laser diode, being a light source, and a photo detector.

Furthermore, in the present embodiment, a tracking and seek control system comprises: a tracking error signal detection circuit (TES detection circuit) 8 for detecting a tracking error signal from an output of the photo detector; a tracking and seek control circuit 9 for controlling a seek motion and tracking motion; and a tracking actuator driver 10 for supplying a driving current to a coil so as to drive the carriage 5 based on an output signal of the tracking and seek control circuit 9.

The carriage 5 can move to a direction (a left-and-right direction in FIG. 1, and hereinafter, this is called as a tracking direction), in which the light beam 4 traverses information tracks on the optical disk 1, with the objective lens 3 and focusing actuator 6 by a driving current $I_{TR}$ supplied from the tracking actuator driver 10 so that all information tracks can be irradiated with the light beam 4. A periphery of this carriage 5 and focusing actuator 6 can be composed as shown in FIG. 2.

Figure 2:
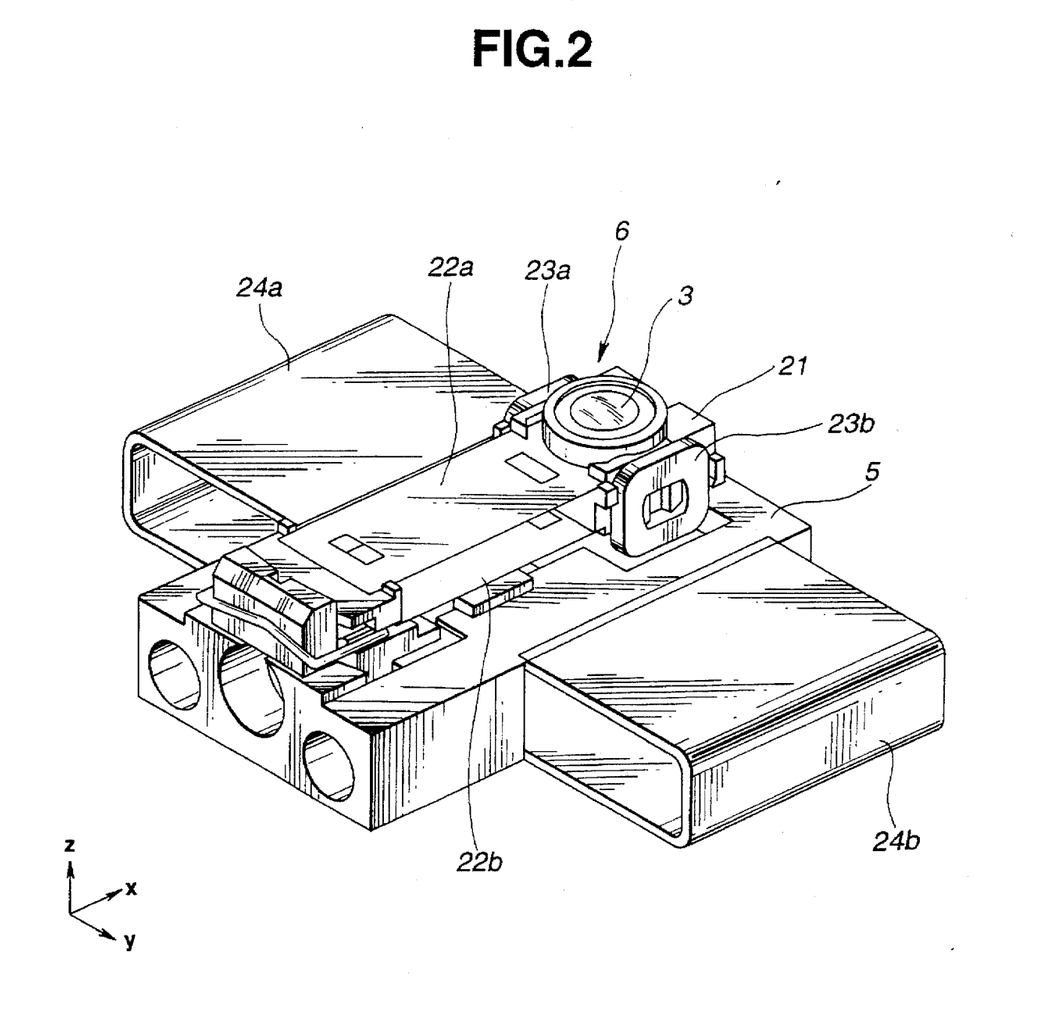
FIG. 2 is a perspective view showing a form of a carriage, focusing actuator, and their vicinity of an optical head.

As shown in FIG. 2, the focusing actuator 6 comprises: a holder 21 for fixing the objective lens 3; leaf springs 22a and 22b for supporting the objective lens 3 toward focusing movably and toward tracking almost fixedly; and focusing coils 23a and 23b for driving the objective lens 3. In addition, the carriage 5 has the focusing actuator 6 thereon and tracking coils 24a and 24b in both sides as carriage driving means for driving the carriage.

Figure 3:
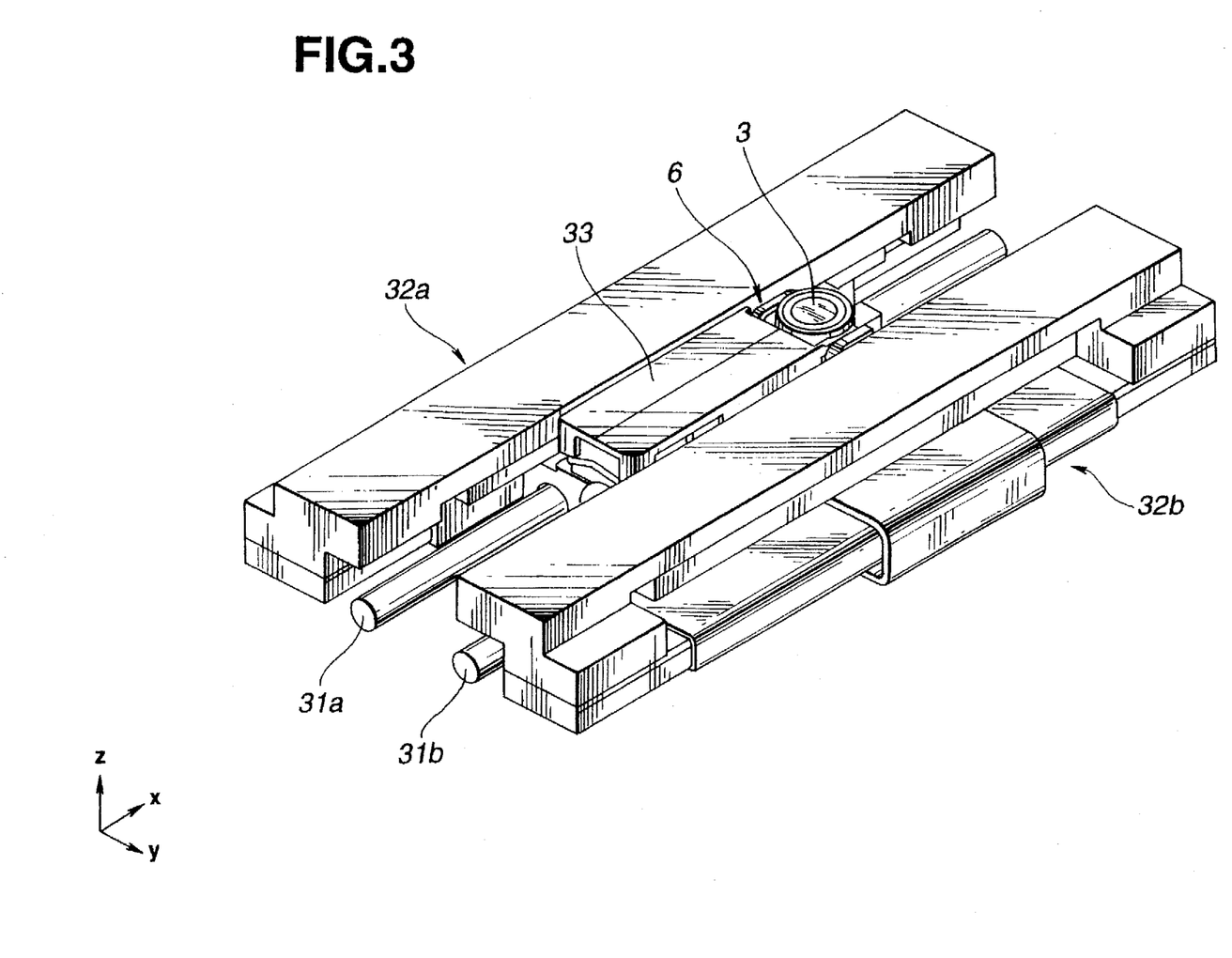
FIG. 3 is a perspective view showing a form of the optical head, having the carriage and focusing actuator shown in FIG. 2 with a magnetic circuit, and its vicinity.

Assume that the optical head is composed of: the carriage 5 and focusing actuator 6 having such composition; and guide shafts 31a and 31b and magnetic circuits 32a and 32b mounted therewith as shown in FIG. 3. Then, the focusing actuator 6 can be driven to the focusing direction by applying a voltage to the focusing coils 23a and 23b, and the carriage 5 can be driven to the tracking direction by applying a voltage to the tracking coils 24a and 24b. Since the light beam 4 is also driven to the tracking direction by driving the carriage 5, an actuator, where fine and coarse actuators are driven in one body, can be composed owing to this configuration. In addition, when the focusing actuator 6 is mounted, the leaf springs 22a and 22b should be covered with a cover 33 as shown in FIG. 3.

A tracking and seek control circuit 9 of the first embodiment comprises: a phase compensation circuit 11 for tracking servo for compensating a phase of a tracking error signal (TES); a binary conversion circuit 12 for converting the tracking error signal TES into a binary code; a speed detection circuit 13 for detecting a moving speed of the light beam 4 to the tracking direction based on an output of the binary conversion circuit 12; a track count circuit 14 for counting a number of tracks to be traversed by the light beam 4 based on the output of the binary conversion circuit 12; a speed designation circuit 15 for generating a speed designation value based on an output of the track count circuit 14; a phase compensation circuit 16 for speed servo for compensating a phase of a speed error signal generated from difference between the output of the speed detection circuit 13 and the output of the speed designation circuit 15; a rush decision circuit 17 for deciding based on the output of the track count circuit 14 that a position of the light beam 4 is at one track before the destination track; a brake pulse generator 18 for generating a brake pulse based on an output of the rush decision circuit 17; a controller 19 for designating and controlling an output of the tracking and seek control circuit 9 based on the outputs of the rush decision circuit 17 and brake pulse generator 18; and a selector 20 for selectively outputting one of outputs of the phase compensation circuit 11 for tracking servo, phase compensation circuit 16 for speed servo, and brake pulse generator 18.

Circuits used in the tracking and seek control circuit 9 can be composed as hardware circuits or software functions similar to the circuits using a DSP (Digital Signal Processor) and the like.

In addition, the following are described on the premise that driving sensitivity (tracking acceleration sensitivity) in a direction, in which the light beam 4 traverses a track when the carriage 5 is driven by a current, is 150 m/s/s/A.

Next, motions of an optical disk system according to the first embodiment will be described with motions of the tracking and seek control circuit 9 composed in such a way as the center.

First, a spindle motor 2 is made rotated in a predetermined speed by a motor control circuit not shown, and a laser diode, which is included in an optical system 7, is made emitted at predetermined output power under driving control of a laser control circuit not shown. Subsequently, the focusing actuator 6 is driven and controlled by a focusing control circuit not shown, and hence, a focusing direction of the object lens 3 is controlled so that the light beam 4 can focus on an information track of the optical disk 1. The reflected light of the light beam 4 reflected from the optical disk 1 is received by a photo detector of the optical system 7, whose output is given to the tracking error signal detecting circuit 8.

In this state, the tracking error signal detection circuit 8 generates a tracking error signal TES, representing the deviation of the applied light beam 4 from a center of an information track, based on an output of the photo detector. Usually, a tracking error signal becomes a zero level at a center of an information track and at an almost intermediate point between tracks, and the signal becomes a signal varying in a sine wave to displacement of the light beam.

The tracking error signal TES is inputted to the phase compensation circuit 11 for tracking servo in the tracking and seek control circuit 9 so that phase compensation is performed. In a usual tracking servo motion, the selector 20 selects an output of the phase compensation circuit 11 for tracking servo by designation of the controller 19 to output it to the tracking actuator driver 10, and feeds the tracking error signal TES back to the carriage 5 as a driving current $I_{TR}$. By means of this driving current $I_{TR}$, the carriage 5 is driven to a direction which corrects positional deviation of the light beam 4 detected by the tracking error signal detection circuit 8.

In this manner, by feeding the tracking error signal back to the tracking coils 24a and 24b driving the carriage, a tracking direction and position of the light beam 4 is controlled so that the tracking error signal may become at the zero level. Hence, tracking control is performed so that the light beam 4 may follow the center of an information track.

In addition, if a write or read instruction to/from an information track different from the current position is given, a seek motion is performed so as to move the light beam 4 to the track where the write or read instruction is executed.

As the control in the seek motion, usually, using the phenomenon that the above-described tracking error signal is outputted only in a period every time the light beam traverses a track, the number of the traversed tracks is counted and traverse speed is detected. Furthermore, speed servo is performed for the control so that the light beam may move along a predetermined speed profile according to the number of residual tracks.

Concretely, first, the tracking error signal TES is converted to a binary code in the binary conversion circuit 12, and the speed of the light beam is detected by measuring an interval of edges of the binary-converted signal in the speed detection circuit 13 and dividing it by a half distance of a track pitch. That is, the speed of the light beam is obtained based on a zero-cross period of the tracking error signal. On the other hand, by counting one side of edges of the binary converted signal in the track count circuit 14, the number of traversed tracks after starting the seek motion and the number of residual tracks are detected. After this, a speed designation value (goal value) is generated in the speed designation circuit 15 based on these track count values. Then, the difference between the speed designation value of the output of the speed designation circuit 15 and the detected speed value of the output of the speed detection circuit 13 is inputted to the phase compensation circuit 16 for the speed servo as a speed error signal. Furthermore, the output of the phase compensation circuit 16 for speed servo is selected in the selector 20, which is outputted to the tracking actuator driver 10. By means of this, the speed servo system can be composed which operates so as to make the speed error zero.

In this time, if a speed profile generated by the speed designation circuit 15 is suitably set, it is possible to perform speed control by which the light beam can move at high-speed on the way and at sufficiently low-speed near the destination track.

When, by the seek motion in such a state in which the speed servo is performed, the light beam arrives just before the destination track, the above-described transition to the tracking servo motion is performed. In this time, as described in Related Art Statement section, the predetermined brake pulse is given after turning off the speed servo, and after that, the track pull-in motion is performed to turn on the tracking servo.

The track pull-in motion in the first embodiment will be described with reference to a timing char in FIG. 4.

Figure 4:
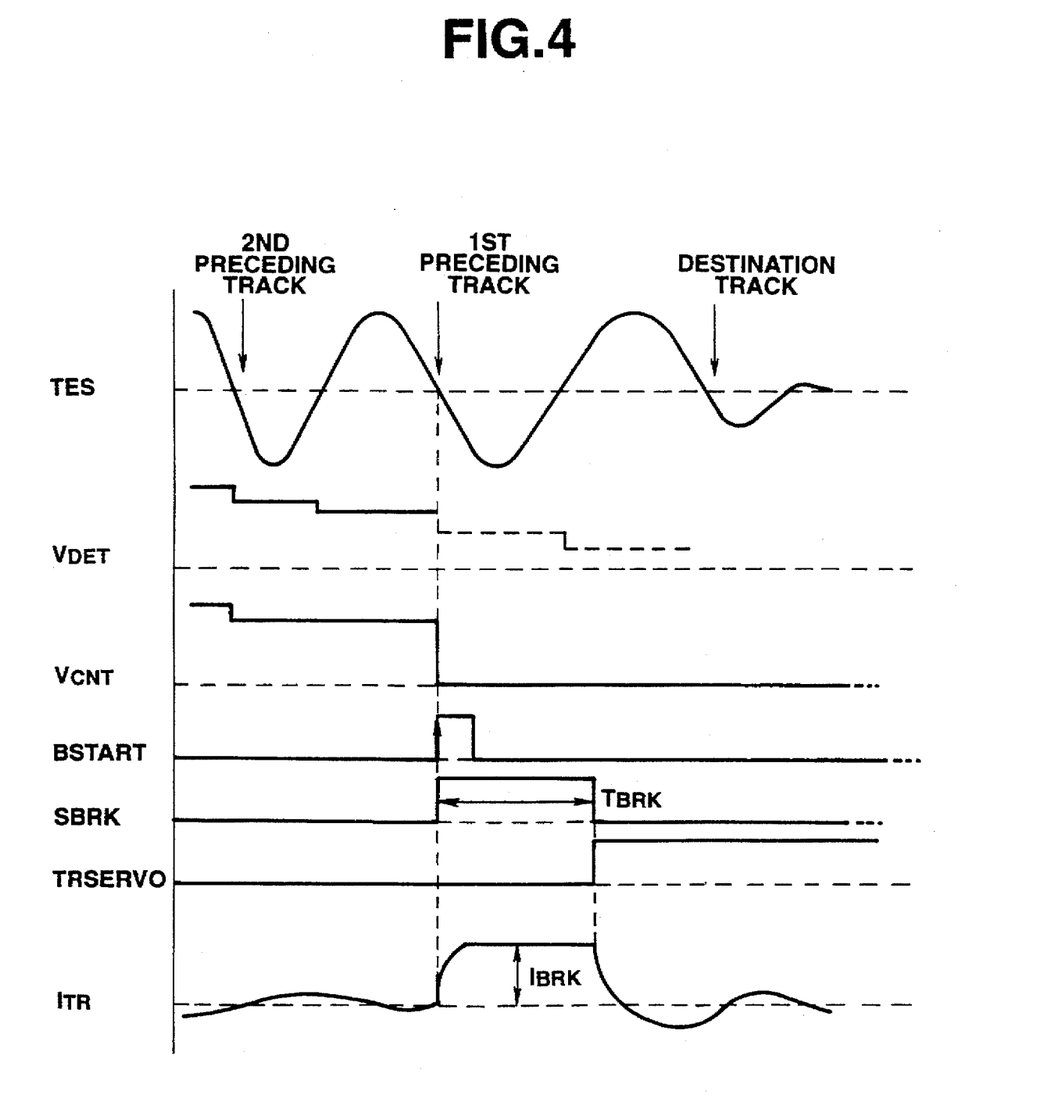
FIG. 4 is a timing chart for explaining a track pull-in motion in the first embodiment.

FIG. 4 shows motions from the second preceding track from the track (the destination track of the seek motion) where the track pull-in is performed. At the second preceding track from the destination track, the position of the light beam is controlled by the speed servo system, and the selector 20 selects the output of the phase compensation circuit 16 for speed servo.

As the light beam 4 approaches the destination track, the tracking error signal TES changes as shown in FIG. 4. The period when the tracking error signal TES performs zero-crossing is a half of the track pitch. Hence, by dividing the distance (for example, 0.7 μm) by the zero-cross time-period, a detected speed value $V_{DET}$ can be obtained in the speed detection circuit 13. The detected speed value $V_{DET}$ is not updated unless the zero-crossing happens on the tracking error signal TES, and hence, the value $V_{DET}$ performs step-like change as shown in FIG. 4.

On the other hand, the speed designation circuit 15 outputs the speed designation value $V_{CNT}$ corresponding to the track count value (the number of residual tracks), and the speed servo is performed so that this speed designation value $V_{CNT}$ may coincide with the above-described detected speed value $V_{DET}$ (the difference between both values may become zero). In addition, let the speed designation value at the time of transition to the track pull-in motion be 10 mm/s, and let the actual speed of the light beam be controlled in 10 mm/s by the function of the speed servo system.

When the rush decision circuit 17 detects that the light beam arrives at the first preceding track from the destination track, the rush decision circuit 17 outputs a BSTART signal as shown in FIG. 4, and the brake pulse generator 18 generates a brake pulse. Simultaneously, by the instruction of the controller 19 receiving the BSTART signal, the selector 20 selectively outputs the brake pulse, that is, the output of the brake pulse generator 18 to the tracking actuator driver 10.

Consequently, the tracking actuator driver 10 outputs a pulsating brake current as shown at the lowest row in FIG. 4 as the driving current $I_{TR}$. The moving speed of the light beam 4 sharply decreases by this brake current, and the selector 20 selects and outputs the output of the phase compensation circuit 11 for tracking servo when the brake pulse is completed (When a gate signal SBRK of the brake pulse shown in FIG. 4 becomes a low-level). By means of this, a TRSERVO signal becomes a high-level as shown in FIG. 4, and the track servo is turned on to pull the light beam in the destination track.

In this track pull-in motion, the width and height of the brake pulse is determined as follows.

The relational expression of the height a and width t of the brake pulse, and the residual distance d to the destination track and the residual speed v as described in Related Art Statement section are as follows:

$t=2d/v$ $\alpha=v^2/(2d)$.

Therefore, the residual speed is assumed to be 10 mm/s (it can be regarded that the final real speed is almost 10 mm/s because designated speed just before braking is 10 mm/s), and the residual distance is assumed to be 1.4 μm. Then, the height a and width t of the brake pulse are calculated as $\alpha=35.7$ [m/s/s] and t=280 [μs]. However, the positional error of 0.28 μm inconveniently happens at completion of the brake pulse as described above. On the other hand, according to consideration of eccentricity and variance by disturbances like vibration, the allowable limit of the positional error is nearly 0.15–0.2 μm.

On the contrary, the width t of the brake pulse being calculated so that the positional error may become 0.15–0.2 μm is nearly t=200–240 μs, and hence this is 70–85% of the original value, 280 μs. That is, in this case, let the width of the brake pulse be more than 200 μs, and then, even if variance of nearly 20% of brake acceleration occurs, it is possible to locate the light beam at a position where track pull-in can be performed at completion of braking. In this time, an amplitude of the brake pulse current can be calculated to be 0.24 A since the brake acceleration=36 m/s/s and the acceleration sensitivity=150 m/s/s/A.

Therefore, it is possible to stabilize the track pull-in motion after completion of braking by setting the amplitude $I_{BRK}$ of the brake pulse current to be 0.24 A and the width $T_{BRK}$ on the brake pulse to be 200 μs. The shorter the width of the brake pulse becomes, the weaker an attenuation force by the brake pulse becomes. However, it is not a problem because another attenuation force derived from the tracking servo becomes available in case of necessity of a further deceleration.

Although the residual speed at the beginning of braking sometimes has some error to the speed designation value of 10 mm/s depending on conditions of eccentricity and vibration, the stable track pull-in can be performed by the brake pulse having the width and height determined in this manner unless there is an extreme speed error.

In this manner, according to the configuration of the first embodiment, in the tracking control circuit to perform the track pull-in after applying the brake pulse at completion of seek, let the width t of the brake pulse be as follows:

$t<2d/v$ where d is the residual distance to the destination track at the beginning of braking, and v is the residual speed. Then, it becomes possible to reduce a positional error from the destination track and dispersion of speed of the light beam when the tracking servo turns on, and to perform the stable pull-in motion.

Thus, since the braking time becomes short, it becomes rare to be influenced by a brake acceleration error, and it becomes possible to decrease both of the positional error and speed error at transition to the tracking control. Furthermore, since the transition to the tracking control is performed in an early stage, an action to make the positional error and speed error small becomes available in the early stage. Still more, since the time when the tracking servo is open becomes short, the positional error and speed error of the light beam influenced by disturbances become also small. By means of these effects, it becomes possible always stably to perform the tracking pull-in motion.

In addition, although, in the first embodiment, the width and height of the brake pulse is fixed, they can be changed through calculation every time a speed value is detected just before the beginning of braking so as to make the track pull-in motion more stable. In this case, it becomes possible to perform the stable track pull-in by setting the width of the brake pulse to be shorter against the detected speed value $V_{DET}$ as follows:

$$t < 2d/V_{DET}$$

Of course, it is possible to change either of the width and height of the brake pulse instead of changing both of them.

Furthermore, although the width of the brake pulse is set to be nearly 70–85% of 2d/v in the first embodiment, the width can be made to be smaller or larger in consideration of the possible acceleration error and pull-in capability of the tracking servo. However, if it is made to be extremely small, there is a possibility of the light beam passing through the destination track due to an insufficient deceleration. On the contrary, if it is made to be extremely large, the tracking servo becomes weak to the acceleration error. Actually, the practical range of the width of the brake pulse is 40–80% of 2d/v.

Next, a second embodiment of the present invention will be described. An optical disk system of the second embodiment is an example of another configuration of the tracking and seek control circuit in the first embodiment shown in FIG. 1.

Figure 5:
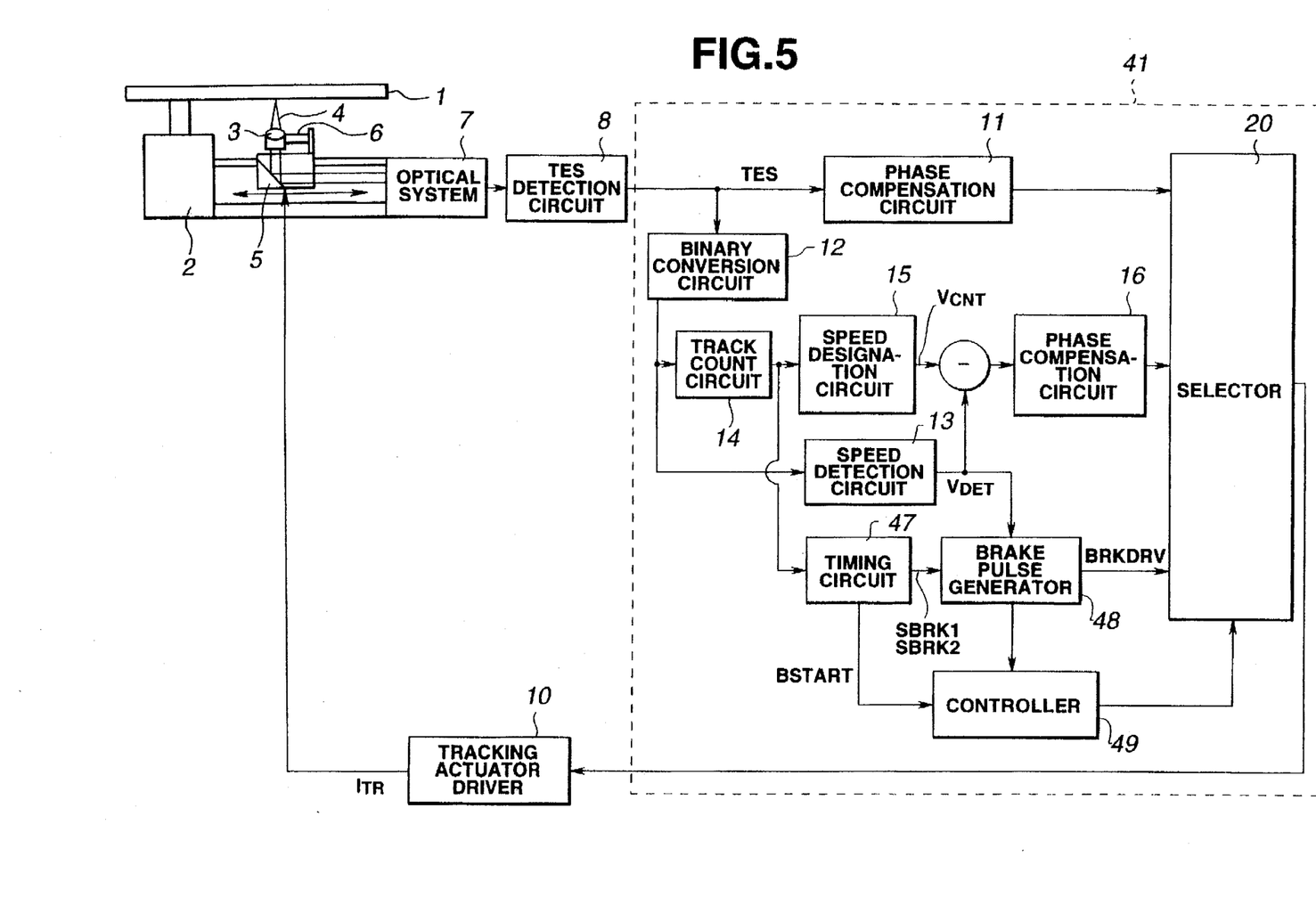
FIG. 5 is a block diagram showing a configuration of a tracking and seek control system in an optical disk system according to a second embodiment of the present invention.

FIG. 5 shows a configuration of a tracking and seek control system including control circuits of an optical disk system according to a second embodiment of the present invention. The same components as those in the first embodiment have the same numerals, and description on them will be omitted.

A tracking and seek control circuit 41 of the second embodiment comprises: a phase compensation circuit 11 for tracking servo for compensating a phase of a tracking error signal (TES); a binary conversion circuit 12 for converting the tracking error signal TES into a binary code; a speed detection circuit 13 for detecting a moving speed of the light beam 4 to the tracking direction based on an output of the binary conversion circuit 12; a track count circuit 14 for counting a number of tracks to be traversed by the light beam 4 based on the output of the binary conversion circuit 12; a speed designation circuit 15 for generating a speed designation value based on an output of the track count circuit 14; a phase compensation circuit 16 for speed servo for compensating a phase of a speed error signal generated from difference between the output of the speed detection circuit 13 and the output of the speed designation circuit 15; a timing circuit 47 for detecting that a position of the light beam 4 is at one track before the destination track, based on the output of the track count circuit 14; a brake pulse generator 48 for generating a brake pulse based on outputs of the timing circuit 47 and speed detection circuit 13; a controller 49 for designating and controlling an output of the tracking and seek control circuit 41 based on the outputs of the timing circuit 47 and brake pulse generator 48; and a selector 20 for selectively outputting one of outputs of the phase compensation circuit 11 for tracking servo, phase compensation circuit 16 for speed servo, and brake pulse generator 48.

Circuits used in the tracking and seek control circuit 41, similarly to the first embodiment, can be composed as hardware circuits or software functions similar to the circuits using a DSP (Digital Signal Processor) and the like.

In addition, the followings are described on the premise that driving sensitivity (tracking acceleration sensitivity) in a direction, in which the light beam 4 traverses a track when the carriage 5 is driven by a current, is 150 m/s/s/A and the sensitivity of the tracking actuator driver 10 is 0.5 A/V.

Next, motions of the tracking and seek control circuit 41 of the second embodiment will be described below.

The tracking error signal TES outputted from the tracking error signal detection circuit 8 is inputted to the phase compensation circuit 11 for tracking servo in the tracking and seek control circuit 41. In a normal tracking servo motion, similarly to the first embodiment, by the instruction of the controller 49, the selector 20 selects the output of the phase compensation circuit 11 for tracking servo and outputs it to the tracking actuator driver 10. Furthermore, the selector feeds the tracking error signal back to the carriage 5 as a driving current $I_{TR}$. Owing to this, the carriage 5 is driven to a direction which corrects the detected misalignment of the light beam 4, and tracking control is performed so that the light beam 4 may follow the center of an information track.

In addition, in the seek motion, similarly to the first embodiment, using a phenomenon that the above-described tracking error signal is outputted only in a period every time the light beam traverses a track, the number of the traversed tracks is counted and traverse speed is detected. Furthermore, the speed servo is performed for control so that the light beam may move along a predetermined speed profile according to the number of residual tracks.

When, by the seek motion in such a state in which the speed servo is performed, the light beam arrives just before the destination track, for the above-described transition to the tracking servo motion, the predetermined brake pulse is given after turning off the speed servo, and after that, the track pull-in motion is performed to turn on the tracking servo.

The track pull-in motion in the second embodiment will be described with reference to a timing chart in FIG. 6.

Figure 6:
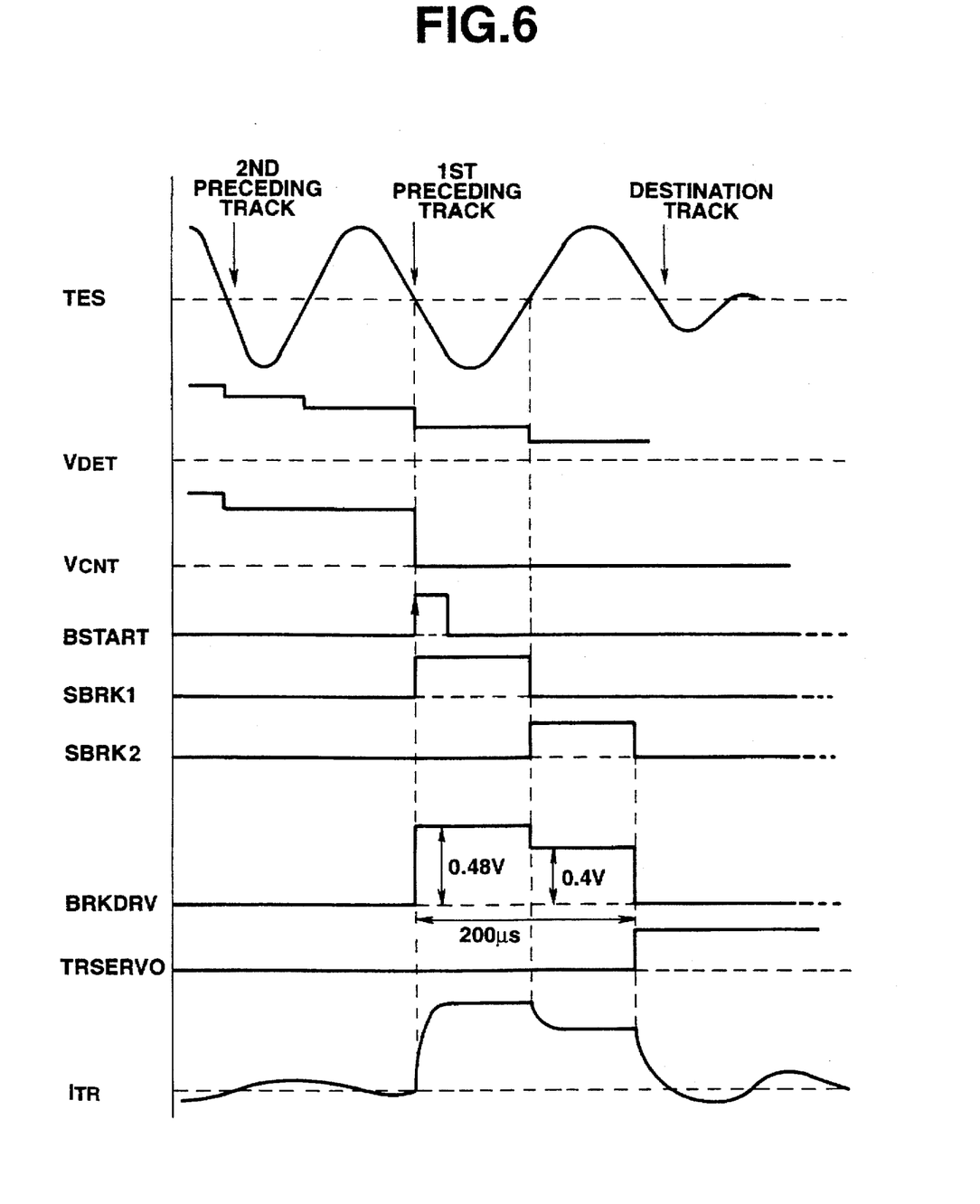
FIG. 6 is a timing chart for explaining a track pull-in motion in the second embodiment.

FIG. 6, similarly to FIG. 4, shows motions from the second preceding track from the destination track. At the second preceding track from the destination track, the position of the light beam is controlled by the speed servo system, and the selector 20 selects the output of the phase compensation circuit 16 for speed servo.

Similarly to the first embodiment, as the light beam 4 approaches the destination track, the tracking error signal TES changes as shown in FIG. 6, to which a detected speed value $V_{DET}$ varying step-wise can be obtained in the speed detection circuit 13.

On the other hand, the speed designation circuit 15 outputs the speed designation value $V_{CNT}$ corresponding to the track count value, and the speed servo is performed so that this speed designation value $V_{CNT}$ may coincide with the above-described detected speed value $V_{DET}$. In addition, the speed designation value at the time of transition to the track pull-in motion is assumed to be 10 mm/s, and let the actual speed of the light beam also be controlled in 10 mm/s by the function of the speed servo system.

When the timing circuit 47 detects that the light beam arrives at the first preceding track from the destination track, the timing circuit 47 outputs a BSTART signal, and the brake pulse generator 48 outputs a brake pulse BRKDRV. Simultaneously, an SBRK1 signal, which is the first gate signal of a brake pulse outputted from the timing circuit 47, becomes a high-level. Furthermore, by the instruction of the controller 49 receiving the BSTART signal, the selector 20 selectively outputs the brake pulse, that is, the output of the brake pulse generator 48 to the tracking actuator driver 10.

The height a in this time needs to be the value as follows, since a final speed is 10 mm/s, and the residual distance is 1.4 µm:

$$\alpha = v^2/2d = 36 \text{ m/s/s}.$$

Assuming that the acceleration sensitivity is 150 m/s/s/A and the driver sensitivity is 0.5 A/V, the height of the brake pulse BRKDRV, which the brake pulse generator 48 outputs, becomes nearly 0.48 V as shown in FIG. 6.

As the light beam 4 sharply decreases its speed by this pulse, the light beam approaches the destination track, and the tracking error signal again has zero-crossing at a half track before the destination track. In this time, the SBRK1 signal becomes a low-level, while a SBRK2 signal, which is the second gate signal, becomes a high-level.

Then, if the deceleration of the light beam is ideally performed by the brake pulse, its speed can be nearly 7 mm/s. However, if there are the dispersion of the driving sensitivity and disturbances, the speed does not always become 7 mm/s. If the driving sensitivity is changed to a higher level, the speed at this point becomes somewhat low because of strong braking, for example, 6.5 mm/s.

Therefore, it becomes possible to detect the state of the deceleration caused by the dispersion of the driving sensitivity and disturbances, and to correct the speed. For example, if the driving sensitivity is a higher level and the speed at this point is lower than the ideal speed of 7 mm/s, it can be corrected by lowering thereafter a peak value of the brake pulse equivalently to the extent.

Then, in this embodiment, at the zero-crossing point of the tracking error signal at a half track before the destination track, the height of the brake pulse BRKDRV is changed to, for example, 0.4 V, which is 20% lower than the original value. Furthermore, by completing the brake pulse when predetermined time, for example, 200 μs from the beginning of outputting the brake pulse passes, a TRSERVO signal is made to be a high-level as shown in FIG. 6, and the tracking servo is again turned on. Then, the light beam is pulled in the destination track by the action of the tracking servo, and hence, the track pull-in motion is completed.

Since, in the second embodiment, the peak value of the brake pulse is corrected on the way as described above, the position and speed of the light beam become in the range, where the track pull-in is possible, when the track servo is turned on.

Figure 7:
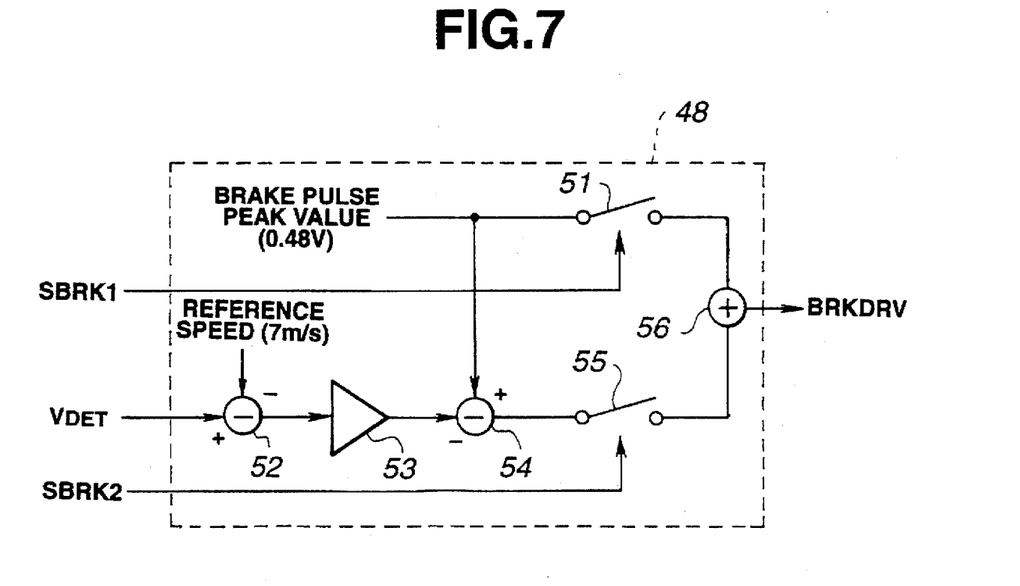
FIG. 7 is a circuit diagram showing a form of a brake pulse generator in the second embodiment.

The above-described brake pulse generator 48 can be configured, for example, as shown in FIG. 7. That is, the brake pulse generator 48 comprises: a subtractor 52 for obtaining the difference between the detected speed value $V_{DET}$ and reference speed (7 mm/s); an amplifier 53 for amplifying an output of the subtractor 52; a subtractor 54 for obtaining the difference between an output of the amplifier 53 and a peak value (0.48 V) of the brake pulse; a switch 51 for turning an peak output value of the brake pulse on/off under the control of the SBRK1 signal; a switch 55 for turning an output of the subtractor 54 on/off under the control of the SBRK2 signal; and an adder 56 for adding outputs of the switch 51 and switch 55.

In this configuration, during a half track after starting outputting of the brake pulse, the height of the brake pulse is fixed, and a peak value, 0.48 V of the brake pulse is outputted as a BRKDRV signal under the control of the SBRK1 signal through the switch 51. Then, after the tracking error signal has again the zero-crossing, the difference between the detected speed value $V_{DET}$ at the occurred point of the zero-crossing and the reference speed, 7 mm/s is amplified by the amplifier 53, by which the original peak value, 0.48 V of the brake pulse is corrected. Furthermore, the corrected peak value of the brake pulse is outputted as the BRKDRV signal under the control of the SBRK2 signal through the switch 55. Here, the Gain of the amplifier 53 can be determined to be, for example, nearly 0.1 V/mm/s.

In this manner, according to the configuration of the second embodiment, in the tracking control circuit where the track pull-in is performed after applying the brake pulse at the completion of seek, it is possible to correct the variance of a deceleration state caused by the dispersion of the actuator sensitivity and the disturbances by starting an output of the brake pulse from a track before the destination track and correcting the height of the brake pulse using the detected speed value obtained from the period of the tracking error signal at the zero-cross timing of the tracking error signal at a half track before the destination track. Owing to this, the position and speed of the light beam can be accurately controlled at the completion of the brake pulse, and hence, it becomes possible to perform the stable track pull-in motion.

In addition, although, in the second embodiment, the peak value of the brake pulse is a fixed value (0.48 V=36 m/s/s) at the beginning of a brake pulse output, this can be changed corresponding to a detected speed value just before the beginning of the brake pulse output. Furthermore, a width of a brake pulse need not be fixed, but it can be changed corresponding to a detected speed value just before the beginning of the brake pulse output, and further, at a zero-crossing point of a tracking error signal during braking, the pulse width can be corrected instead of the pulse height.

Still more, the height or width of a brake pulse is not corrected continuously corresponding to the detected speed value, but the values can be switched in some steps corresponding to whether the detected speed value exceeds some reference values.

Next, a third embodiment of the present invention will be described. Although, in the second embodiment, the height of a brake pulse is continuously changed corresponding to a detected speed value during outputting of a brake pulse, effects similar to those in the second embodiment can be obtained by selectively changing the height of a brake pulse corresponding to whether the speed of the light beam exceeds a reference value (whether the zero-crossing period is equal to, longer than, or shorter than a predetermined value). A configuration example in this case will be described below as the third embodiment.

Figure 8:
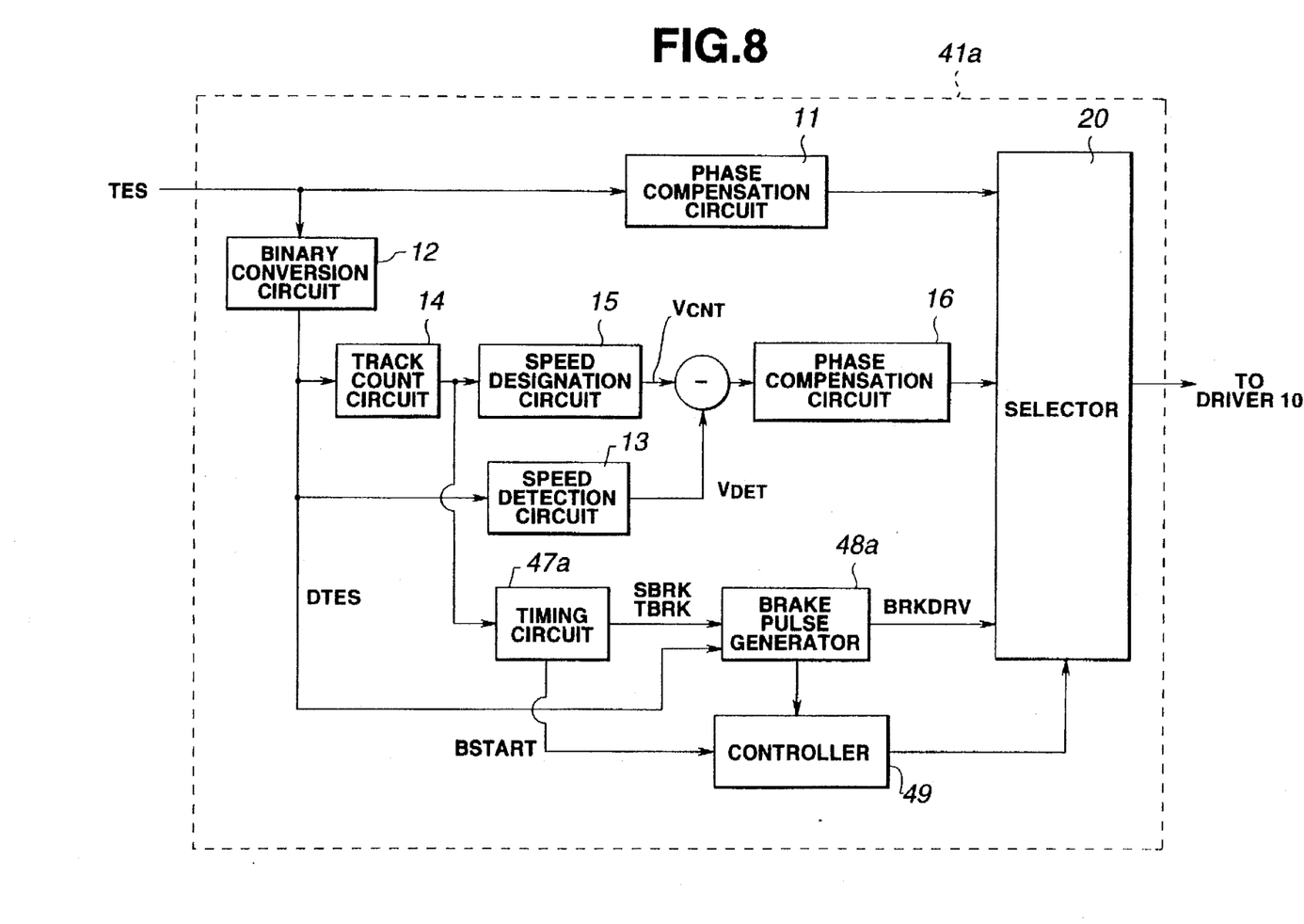
FIG. 8 is a block diagram showing a configuration of a tracking and seek control system in an optical disk system according to a third embodiment of the present invention.

FIG. 8 is a block diagram showing a configuration of a tracking and seek control circuit 41a according to the third embodiment. In comparison to the second embodiment, only the functions of a timing circuit 47a and brake pulse generator 48a are different, and hence, duplicated description will be omitted.

A track pull-in motion in the tracking and seek control circuit 41a of the third embodiment will be described based on a timing chart in FIG. 9.

Figure 9:
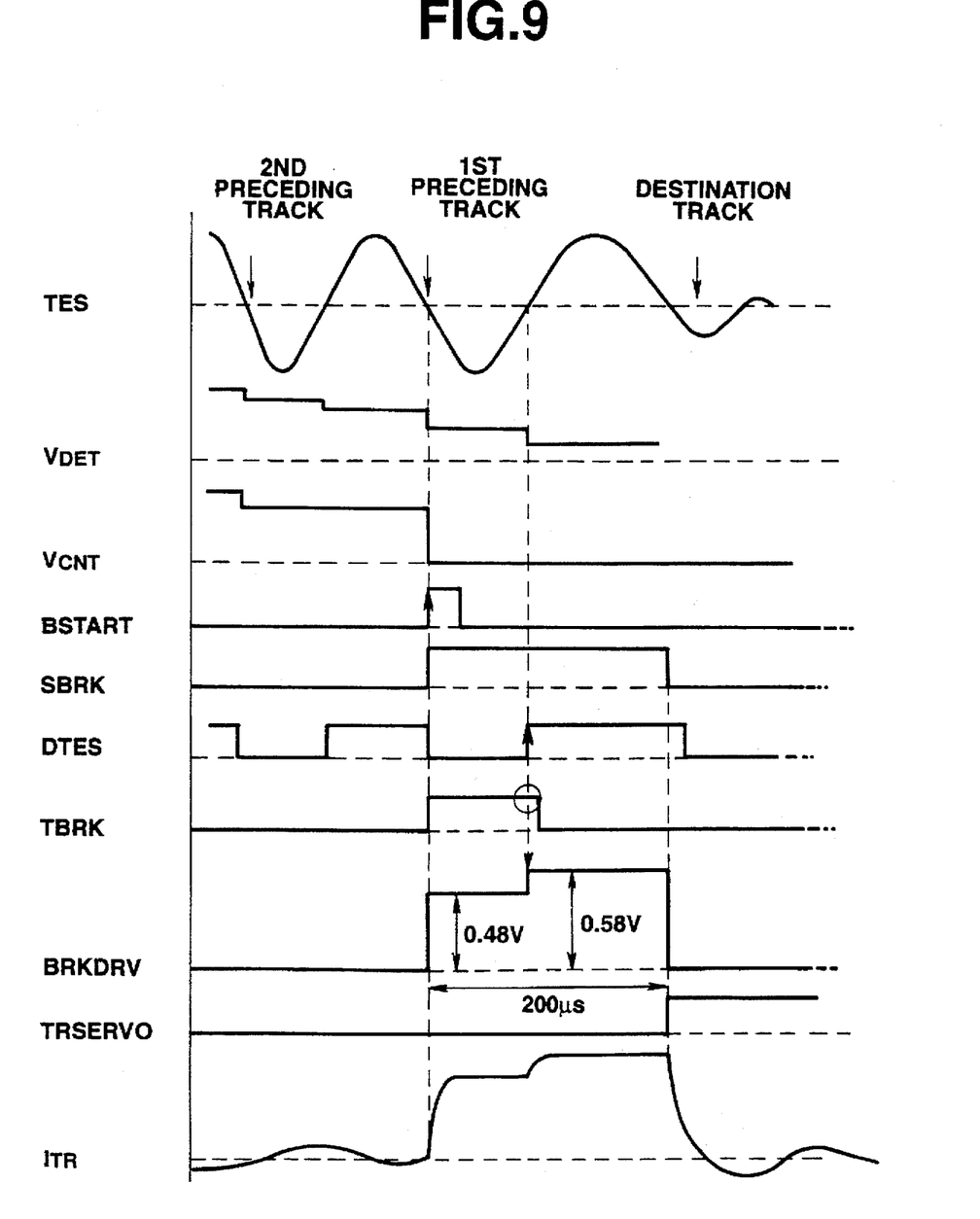
FIG. 9 is a timing chart for explaining a track pull-in motion in the third embodiment.

Similarly to the above-described second embodiment, when it is detected by the timing circuit 47a that the light beam arrives at a track before the destination track, the timing circuit 47a outputs a BSTART signal shown in FIG. 9 to turn the speed servo off. In addition, the brake pulse generator 48a outputs a brake pulse BRKDRV. Furthermore, it is assumed that a speed of the light beam and a peak value of the brake pulse at the beginning of braking are the same as those in the second embodiment.

At the same time, a timer is activated inside the timing circuit 47a, and an output of a TBRK signal shown in FIG. 9 is started. It is recommended that a pulse width of the TBRK signal is nearly the time interval, when the light beam arrives in the vicinity of a half track before the destination track if deceleration is performed without sensitivity dispersion and disturbances, in this case, about 80 μs. Similarly to the second embodiment, if the moving speed of 10 mm/s is decreased at a deceleration of 36 m/s/s, the moving time in the distance of a half track, 0.7 μm is nearly 80 μs.

As the light beam is decelerated by the above-described action of the brake pulse, it arrives at a half track before the destination track, and in this time, the tracking error signal has the zero-crossing again. The timing of this zero-crossing is almost the same as the timing when the TBRK signal returns to a low-level, if ideal deceleration is performed. However, actually, the timings sometimes differ from each other due to sensitivity dispersion and disturbances. An example in FIG. 9 shows a case that the moving speed of the light beam is higher than a theoretical speed because of a small deceleration, and the zero-crossing of the tracking error signal precedes.

In this manner, in case the timing of the zero-crossing of the tracking error signal is earlier than that of completion of the TBRK signal, that is, an output of the timer, the speed is somewhat high. Hence, the peak value of the brake pulse BRKDRV is increased from 0.48 V to 0.58 V as shown in FIG. 9 in the brake pulse generator 48a and deceleration thereafter is increased. Owing to this, since the light beam is strongly decelerated and its speed is sufficiently decreased at the completion of the brake pulse, the stable track pull-in motion can be performed.

Figure 10:
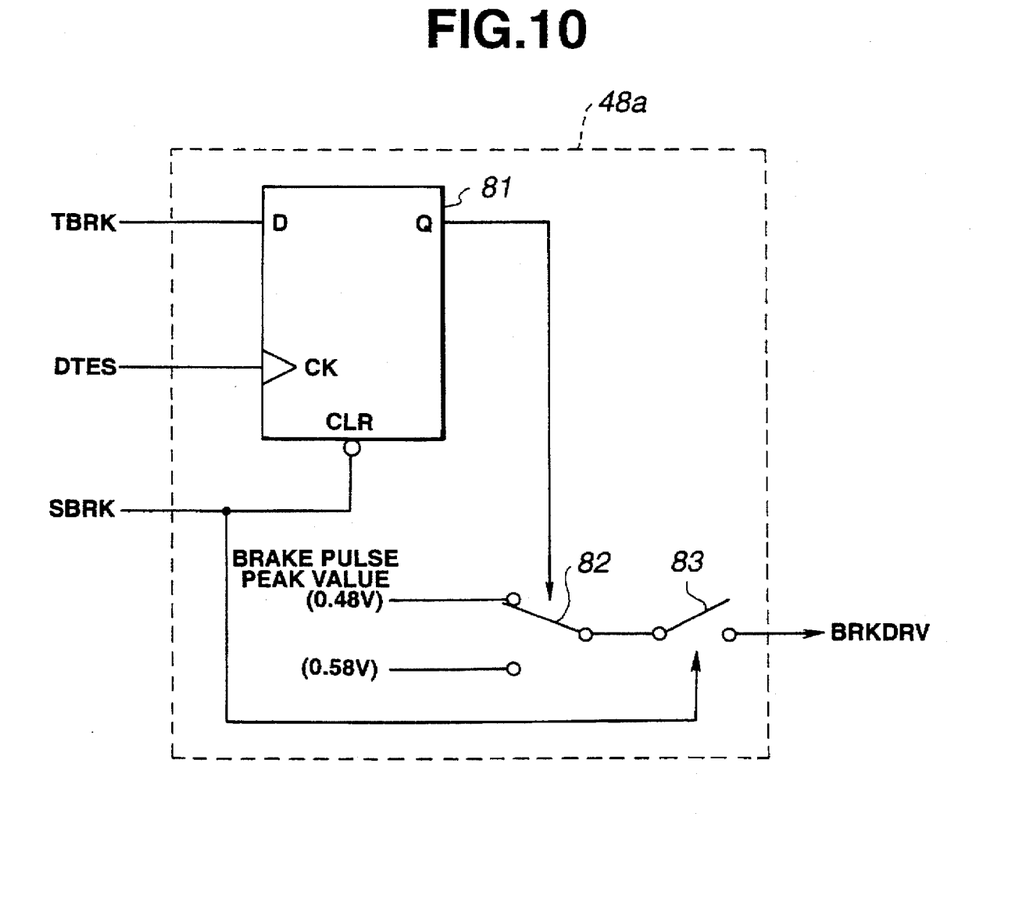
FIG. 10 is a circuit diagram showing a form of a brake pulse generator in the third embodiment.

The above-described brake pulse generator 48a can be configured, for example, as shown in FIG. 10. Thus, the brake pulse generator 48a functioning as means for comparing timings comprises: a latch 81 for latching an output TBRK of the timer at a leading edge of a binary converted signal DTES of a tracking error signal; a switch 82 for switching 0.48 V and 0.58 V of peak values of a brake pulse by an output of the latch 81; and a switch 83 for turning a peak output value of the brake pulse on/off under the control of the SBRK signal which is a gate signal of the brake pulse.

In this configuration, by the latch 81, the output TBRK of the timer is latched in a high-level or low-level at a leading edge of the binary converted signal DTES of the tracking error signal, and the peak value of the brake pulse is switched in the switch 82 using this output. In this manner, in case the timer output TBRK is a low-level (that is, speed is low) at the leading edge of the binary converted signal DTES of the tracking error signal, 0.48 V is continuously outputted as a peak value of the brake pulse. On the other hand, in case the timer output TBRK is a high-level (that is, speed is high) at the leading edge of the binary converted signal DTES, a peak value of the brake pulse is switched to 0.58 V, which is outputted as a BRKDRV signal.

In this manner, according to the configuration of the third embodiment, the timer is provided for measuring a predetermined time from the beginning of the brake pulse output. Furthermore, the peak value of a brake pulse is changed corresponding to which is earlier, completion of measurement of the predetermined time with the timer and occurrence of the zero-crossing in the tracking error signal. Owing to this, though this is a simple circuit configuration in comparison to that of the second embodiment, it becomes possible to reduce the dispersion of a position and speed of the light beam at completion of the brake pulse. Therefore, the stable track pull-in motion can be performed at completion of the seek motion.

In addition, in the third embodiment, the peak value of the brake pulse is changed at the timing of zero-crossing of the tracking error signal. However, the height of the brake pulse can be changed according to a level of the binary converted signal of the tracking error signal at completion of the timer output. Furthermore, instead of making the brake pulse high when the speed of the light beam is high, by performing the correction that the brake pulse is lowered when the speed is low like the second embodiment, the similar effects can be also obtained. Still more, after measuring the time difference between the occurrence of zero-crossing of the tracking error signal and completion of the timer, the peak value and width of the brake pulse can be continuously changed according to the time difference.

In addition, instead of changing the height of the brake pulse, the width (completion time) of the brake pulse can be changed, or both of them can be changed.

Furthermore, although the starting timing of the brake pulse output is set to be a track before the destination track in the first to third embodiments, it is not limited to this timing. Thus, it can be a half track before or one or more tracks before the destination track. However, since the shorter braking period makes this motion stronger to influences such as disturbances, it is desirable to start the output at one track before the destination track. Still more, the actuator, where the fine and coarse actuators are driven in one body in a tracking direction, is used as the actuator. However, it is not limited to the actuator where the fine and coarse actuators are driven in one body. Thus, the present embodiment can be also applied to a conventional type of actuator where fine and coarse actuators are driven independently, or another type of actuator where a fine actuator is mounted on a coarse actuator.

In addition, the timing of starting a brake pulse output and the timing of correcting it can be somewhat shifted from the timing of zero-crossing of a tracking error signal. For example, in case a hysteresis comparator is used for binary conversion of a tracking error signal so as to reduce the influence of noises, the timing of outputting a brake pulse is somewhat delayed from the zero-crossing of the tracking error signal and the light beam approaches nearer to the destination track. However, in that case, in consideration of the difference between the timing of the binary converted signal varying and the real timing of the zero-crossing of the tracking error signal, each parameter can be determined.

As described above, in each above-described embodiment, it becomes possible to reduce the influences caused by errors of an actuator and disturbances by shorten the braking period at the beginning of the track pull-in motion. Consequently, it produces an effect that it becomes possible to stabilize the track pull-in motion after completion of braking.

In addition, even if the track pull-in motion is easily affected by the dispersion of the actuator sensitivity and disturbances due to a long braking period at the beginning of the track pull-in motion, it is possible to reduce difference of a position and speed of the light beam from the destination track at completion of braking. Consequently, it produces the effect that it becomes possible to stabilize the track pull-in motion.

In the present invention, it is apparent that it is possible to construct embodiments different in a wide range according to the present invention without departing from the spirit and scope thereof. The scope of the present invention should not be limited to the embodiments described above, and should instead be defined by the accompanying claims.

What is claimed is:

1. A control circuit of an optical disk system having a tracking and seek control means for controlling a position of a light beam emitted for recording and playing information to/from a track on an optical disk by driving a tracking actuator based on a tracking error signal representing at least positional difference between said light beam and said track, selectively performing seek control for controlling said light beam so that said light beam traverses said track for moving said light beam to a destination track, controlling tracking of said light beam so that said light beam follows said track, and outputting a brake pulse and moving control to the tracking control at completion of the brake pulse at completion of said seek control, wherein a width t of said brake pulse is set as follows:

$$t<2d/v$$

where v is a goal value of a speed and d is a residual distance of said light beam to the destination track at the beginning of outputting said brake pulse.

2. A control circuit of an optical disk system according to claim 1, wherein the width of said brake pulse is set as follows:

$$0.35 \times 2d/v < t < 0.85 \times 2d/v.$$

3. A control circuit of an optical disk system according to claim 1, wherein the residual distance to said destination track is set to a pitch of said track.

4. A control circuit of an optical disk system according to claim 1, wherein the width of said break pulse is set as follows:

$$0.35 \times 2d/V_{DET} < t < 0.85 \times 2d/V_{DET}$$

where $V_{DET}$ is a detected speed value of said light beam just before the beginning of outputting said brake pulse.

5. A control circuit of an optical disk system having a tracking and seek control means for controlling a position of a light beam emitted for recording and playing information to/from a track on an optical disk by driving a tracking actuator based on a tracking error signal representing at least positional difference between said light beam and said track, selectively performing seek control for controlling said light beam so that said light beam traverses said track for moving said light beam to a destination track, controlling tracking of said light beam so that said light beam follows said track, outputting a brake pulse to said tracking actuator at completion of said seek control from at least one track before the destination track and control is moved to said tracking control at completion of the brake pulse, wherein at least one of a peak value and a width of the brake pulse is corrected based on said tracking error signal included in the brake pulse output.

6. A control circuit of an optical disk system according to claim 5, wherein at least either of a peak value and width of said brake pulse is changed based on a zero-crossing period of said tracking error signal included in the brake pulse output.

7. A control circuit of an optical disk system according to claim 5, wherein outputting of said brake pulse is started from nearly one track before said destination track, and, at a zero-crossing point of said tracking error signal, namely, the point which is nearly a half track before said destination track, at least either of a peak value and width of said brake pulse is changed.

8. A control circuit of an optical disk system according to claim 5, further comprising a timer for measuring a predetermined time from the beginning of said brake pulse output, and timing comparing means for comparing and detecting timing of measurement completion due to passage of the predetermined time measured by said timer and timing of occurrence of zero-crossing in said tracking error signal, wherein at least either of a peak value and width of the brake pulse is changed based on an output of said timing comparing means.

9. A control circuit of an optical disk system according to claim 8, wherein outputting of said brake pulse is started from nearly one track before said destination track, and said timer measures a time nearly equal to a standard time necessary for said light beam moving from one track before said destination track to a half track before said destination track.

10. A control circuit of an optical disk system according to claim 1, wherein said tracking actuator has an objective lens which condenses said light beam on a carriage and is fixed to a direction in which said light beam traverses said track, and moves said carriage so that said light beam is applied to a range where a track on said optical disk exists.

11. A control circuit of an optical disk system according to claim 5, wherein said tracking actuator has an objective lens which condenses said light beam on a carriage and is fixed to a direction in which said light beam traverses said track, and moves said carriage so that said light beam is applied to a range where a track on said optical disk exists.

12. An optical disk system using a light beam for recording and playback of information to and from an optical disk, said optical disk system comprising:

a speed servo device controlling movement of the light beam to a destination track on the optical disk in a seek operation;

a braking device generating a brake pulse upon nearing the destination track in the seek operation; and a tracking servo device controlling the light beam to follow the destination track upon completion of the brake pulse, wherein the brake pulse is set as t<2d/v, where t is a width of the brake pulse, v is a target speed for movement of the light beam, and d is a residual distance between a position of the light beam and the destination track when the brake pulse is generated by said braking device.

13. An optical disk system using a light beam for recording and playback of information to and from an optical disk, said optical disk system comprising:

a speed servo device controlling the movement of the light beam to a destination track on the optical disk in a seek operation;

a braking device generating a brake pulse upon nearing the destination track in the seek operation; and a tracking servo device controlling the light beam to follow the destination track upon completion of the brake pulse, wherein said braking device changes at least one of a peak value and a width of the brake pulse based on a tracking error signal included in a brake pulse output to allow correction of a speed of movement of the light beam to a predetermined target speed.

14. An optical disk system according to claim 13, further comprising a tracking actuator driving the movement of the light beam based on the tracking error signal representing a positional difference between the light beam and the destination track, and wherein said braking device changes at least one of the peak value and the width of the brake pulse at a zero-crossing of the tracking error signal.

15. An optical disk system according to claim 13, wherein said braking device generates the brake pulse when the light beam is at one track from the destination track, and wherein said braking device changes at least one of the peak value and the width of the brake pulse when the light beam is at one-half track from the destination track.

16. An optical disk system according to claim 13, further comprising:

a tracking actuator driving the movement of the light beam based on the tracking error signal representing a positional difference between the light beam and the destination track; and a timer measuring a predetermined time from when the brake pulse is generated, wherein said braking device generates the brake pulse when the light beam is at one track from the destination track, wherein said braking device increases at least one of the peak value and the width of the brake pulse when a zero-crossing of the tracking error signal occurs before the predetermined time is measured by said timer, and wherein said braking device decreases at least one of the peak value and the width of the brake pulse when a zero-crossing of the tracking error signal occurs at the predetermined time measured by said timer.

* * * * *